(12) United States Patent
Henry et al.

(10) Patent No.: US 11,712,922 B2
(45) Date of Patent: Aug. 1, 2023

(54) HUB CAP VENT PLUG

(71) Applicant: Equalaire Systems, Inc., Corpus Christi, TX (US)

(72) Inventors: Dane Henry, Windcrest, TX (US); Mark Kevin Hennig, Corpus Christi, TX (US)

(73) Assignee: Pressure Systems International, LLC, San Antonio, TX (US)

(*) Notice: Subject to any disclaimer, the term of this patent is extended or adjusted under 35 U.S.C. 154(b) by 611 days.

(21) Appl. No.: 16/627,696

(22) PCT Filed: Jun. 29, 2018

(86) PCT No.: PCT/US2018/040329
§ 371 (c)(1),
(2) Date: Dec. 30, 2019

(87) PCT Pub. No.: WO2019/006325
PCT Pub. Date: Jan. 3, 2019

(65) Prior Publication Data
US 2020/0164681 A1 May 28, 2020

Related U.S. Application Data

(60) Provisional application No. 62/527,537, filed on Jun. 30, 2017.

(51) Int. Cl.
*B60B 7/00* (2006.01)
*B60B 27/00* (2006.01)

(52) U.S. Cl.
CPC .......... *B60B 7/002* (2013.01); *B60B 27/0073* (2013.01)

(58) Field of Classification Search
CPC .............................. B60B 7/002; B60B 7/0013
See application file for complete search history.

(56) References Cited

U.S. PATENT DOCUMENTS

| | | |
|---|---|---|
| 3,114,579 A | 12/1963 | Isenbarger |
| 3,316,022 A | 4/1967 | Isenbarger |
| 3,331,638 A | 7/1967 | Fruth |
| 3,395,950 A | 8/1968 | Brandt |
| 5,066,071 A | 11/1991 | Kinser |
| 5,195,807 A | 3/1993 | Lederman |
| 5,492,393 A | 2/1996 | Peisker et al. |
| 5,505,525 A | 4/1996 | Denton |
| 5,752,746 A | 5/1998 | Perry |
| 5,785,390 A | 7/1998 | Gold et al. |
| 5,860,708 A | 1/1999 | Borders |
| 6,676,227 B1 | 1/2004 | Stanczak |
| 6,938,963 B2 | 9/2005 | Denton |
| 7,156,890 B1 | 1/2007 | Thompson |
| 2017/0080760 A1 | 3/2017 | Foor et al. |

*Primary Examiner* — Jason R Bellinger
(74) *Attorney, Agent, or Firm* — Pizarro Allen PC

(57) ABSTRACT

A vent for a hub cap may include a screen and fluid channels for release of pressurized fluid in a hub cap.

19 Claims, 10 Drawing Sheets

HUB CAP VENT PLUG

CROSS-REFERENCE TO RELATED APPLICATION

This application is a US national stage entry of International Patent Application No. PCT/US2018/040329 entitled "HUB CAP VENT PLUG" filed Jun. 29, 2018, which claims priority to U.S. Provisional Patent Application No. 62/527,537 entitled "HUB CAP VENT PLUG" filed Jun. 30, 2017, the specifications of which are hereby entirely incorporated herein by reference.

FIELD

This application relates generally to the venting of pressure from a vehicle hub cap.

BACKGROUND

A hubcap configured for use with an automatic tire inflation system may be over-pressurized during use due to leakage of air from tire inflation system components. For example, a hubcap having the rotary union of an automatic tire inflation system disposed therein may experience fluid pressure sufficient interfere with the proper lubrication of the wheel end components and damage to wheel end seals. Over-pressurization may thus lead to loss of wheel-end lubricant, which can result in wheel bearing seizure and loss of the wheel end.

There exists a need for a hub cap vent plug capable of high volume release of pressure from the hubcap.

SUMMARY

A hub cap vent plug comprising a stub configured for sealing disposition in a vent opening of a hub cap, the stub forming a fluid chamber and one or more vent orifices extending from the fluid chamber, the fluid chamber and one or more vent orifices configured to allow communication of fluid from the interior of a hub cap to atmosphere; a shroud disposed at the end of the stub and configured to shield the vent orifices venting to atmosphere; and a screen disposed in the fluid channel, the screen being configured to capture vapor from fluid vented from the hub cap.

A hub cap vent plug comprising a stub configured for sealing disposition in a vent opening of a hub cap, the stub forming a fluid chamber and one or more vent orifices extending from the fluid chamber, the fluid chamber and one or more vent orifices configured to allow communication of fluid from the interior of a hub cap to atmosphere; and a screen disposed in the fluid channel, the screen being configured to capture vapor from fluid vented from the hub cap.

A hub cap vent plug comprising a stub configured for sealing disposition in a vent opening of a hub cap, the stub forming a fluid chamber and one or more vent orifices extending from the fluid chamber, the fluid chamber and one or more vent orifices configured to allow communication of fluid from the interior of a hub cap to atmosphere; a screen disposed in the fluid channel, the screen being configured to capture vapor from fluid vented from the hub cap; and a gland disposed about the stub so as to seal the vent orifices.

DETAILED DESCRIPTION

Figure 1:
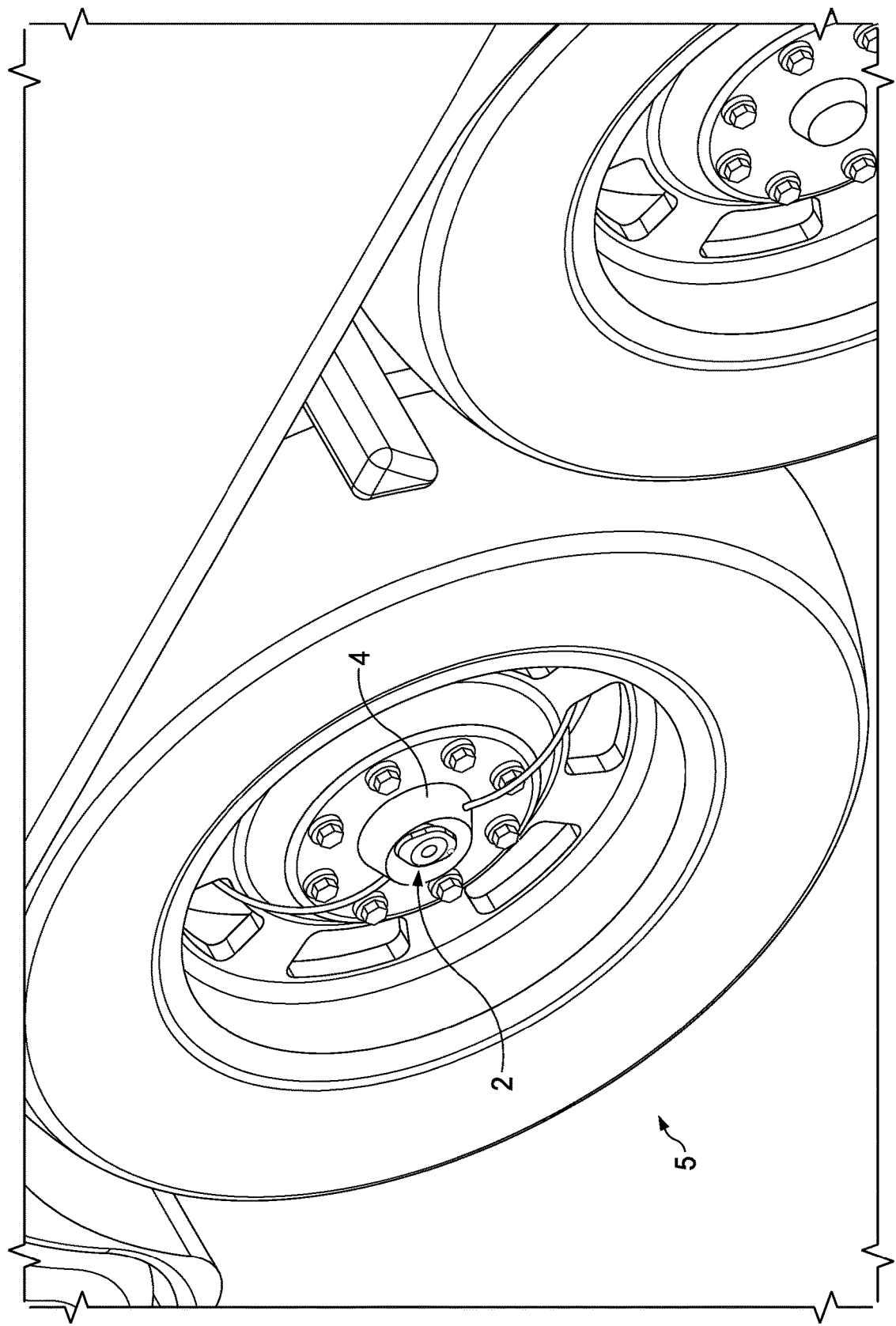
FIG. 1 illustrates a vehicle wheel end with a vent plug installed.

A hub cap may become over-pressurized from a variety of sources. For example, a hub cap having a rotary union disposed therein, such as described in PCT/US2014/061879 entitled "Rotary Union for Automatic Tire Inflation System," may be advantageously vented using a high-volume vent as described herein.

A hub cap vent plug may release internal pressure from a hub cap, such as when the pressure has exceeded atmospheric pressure, or when the fluid pressure in the hub cap exceeds a pre-determined pressure. Such a hub cap vent plug may comprise a plug body or stub, and a shroud. The stub may be configured to seat the vent plug in a wall of a hubcap so as to dispose the vent plug shroud against or near the wall of the hubcap. In some embodiments, the vent plug may be disposed on the outer face of the hubcap and centered on the rotational axis of the hubcap. So disposed, the stub allows fluid communication between the shroud and the interior of the hubcap. The stub may have a small flange for sealing and retaining the vent plug to the hub cap. The stub may comprise a retention bulge circumferentially disposed thereabout. The stub may be thus configured to permit the vent plug to snap into the hubcap for secure retention therein, yet be removable.

In other embodiments, a stub may be configured for tamper-proof installation, such as by a cross-pin, keyed lock, or locking threads to affix the stub to the hub cap. In such embodiments, removal of the stub may require specialized tools or removal of the hub cap. In some embodiments, for example, after the vent plug has been installed on a hub cap, a pin may be disposed through the stub at the interior of the hub cap before the hub cap is installed on the vehicle, thus preventing easy removal of the plug from the hub cap. In other embodiments, the vent plug stub may thread into the hub cap, and a lock nut may be disposed thereon to prevent removal of the vent plug without removal of the hubcap from the wheel-end. In yet further embodiments, the stub may comprise breakaway flanges that break off when the vent plug is removed from the hub cap, thus rendering the vent plug difficult to re-mount or re-use.

The interior of the stub may form a fluid chamber having an optional knockdown screen disposed therein. One or more vent orifices extend radially through the stub to provide fluid flow from the interior of the hubcap to atmosphere beyond the shroud. Such a screen may hinder or prevent the escape of fluid that is entrained in the vapor released by the vent plug. The screen may be fine mesh metal or may be any other material that can trap the liquid while allowing the vapor to pass onward. Some examples of such materials are felt padding, metallic wools, and certain fabrics. The knockdown screen may also be a vapor permeable filter.

The shroud and stub may be a unitary body or the shroud may be detachable from the stub. The shroud may form one or more vent channels radiating from stub fluid chamber. These orifices may open to atmosphere under the shroud. A gland channel may be disposed circumferentially along the outer wall of the shroud. The gland channel may act as a diffuser for the exiting vapor.

An o-ring or resilient gland may be disposed in the gland channel so as to cover and seal the venting orifices from the ingress of external contaminants. Such contaminants may be dirt and dust, water, or other materials that could damage the wheel end should such materials gain entry to the hubcap. While the o-ring seals against contaminant ingress, the o-ring may be of an appropriate elasticity that the pressurized vapor may escape past the o-ring. The o-ring may be of any cross-sectional geometry, such as round, oval, square or rectangular. After passing the o-ring gland, the pressure may then escape to atmosphere for dissipation.

In another example, a high-temperature warning system, such as that disclosed in U.S. Pat. No. 6,892,778, includes a normally-closed valve connected to a fluid pressure source may be disposed in or on an axle spindle end, such as in an axle plug, such that high-pressure fluid is released into the hub cap interior when the valve is opened. If pressurized fluid is released upon activation of a heat sensitive control, then the fluid pressure and fluid flow released through the valve may be correspondingly high. For example, the normally-closed valve may open to provide an opening of between about ⅛ inch to about ½ inch, or more particularly through an about ¼ inch, opening through which fluid may flow.

In such examples, a high-volume vent plug as disclosed herein will advantageously provide a high-volume fluid flow path to a more rapidly release fluid pressure from the hub cap, thus substantially reducing the opportunity for the pressurized fluid to damage wheel bearing seals or force impurities into a wheel bearing. The availability of such high-volume fluid flow path may also advantageously prevent excessive leakage of lubrication, which can reduce the amount of lubrication available for wheel end bearings, and can create unsightly and messy spray on a wheel end when the vehicle is traveling on a road.

Referring to the embodiment of FIG. 1, a high-flow hub cap vent plug 2 may be disposed at the center of the outboard face of a hub cap 4 mounted to a wheel end 5.

Figure 2:
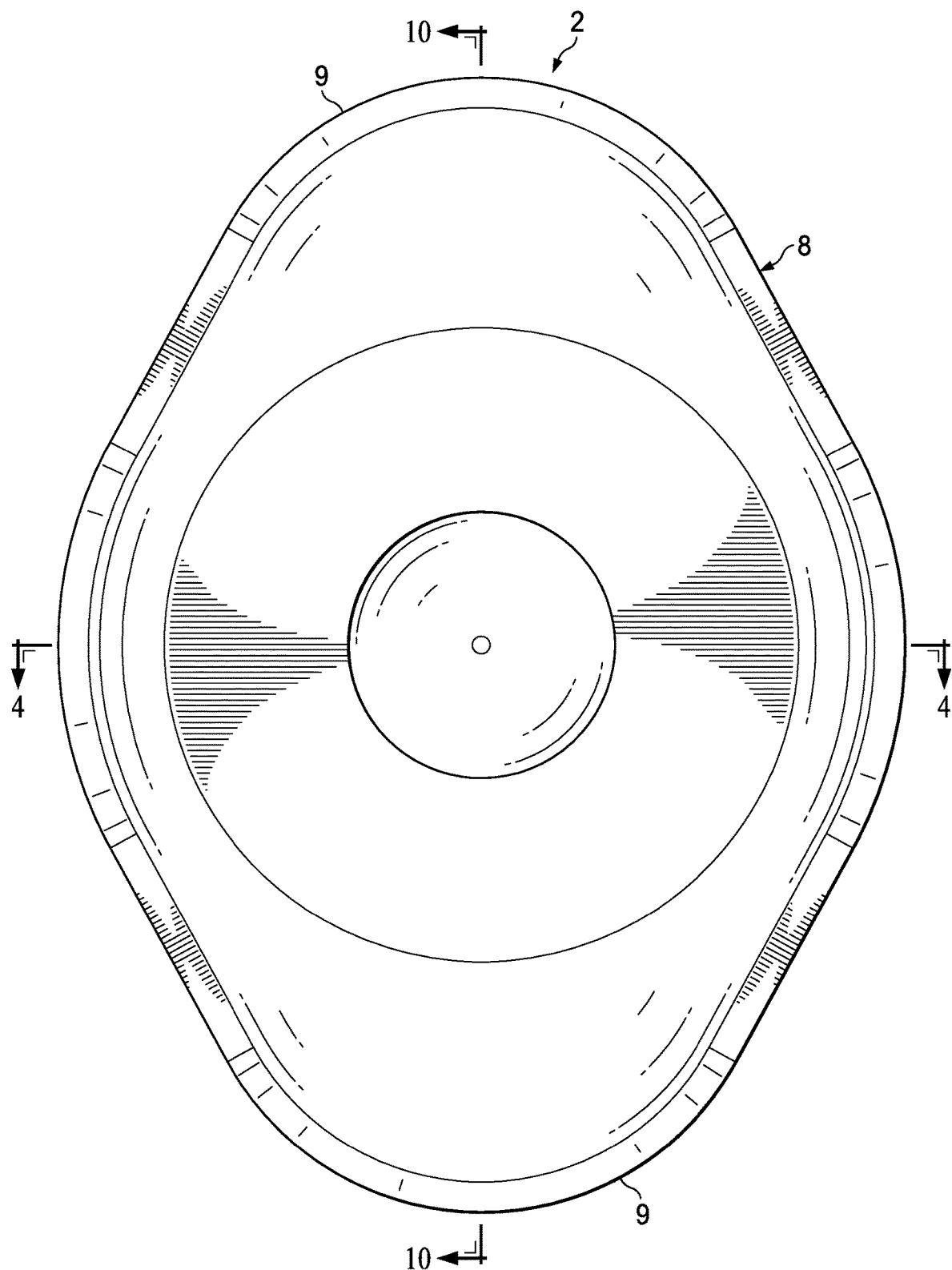
FIG. 2 illustrates a plan view of a vent plug.

As may be seen in FIG. 2, the plug comprises a shroud 8. The shroud may include one or more lobes 9. Each lobe 9 may be configured to shield the opening of a vent orifice.

Figure 3:
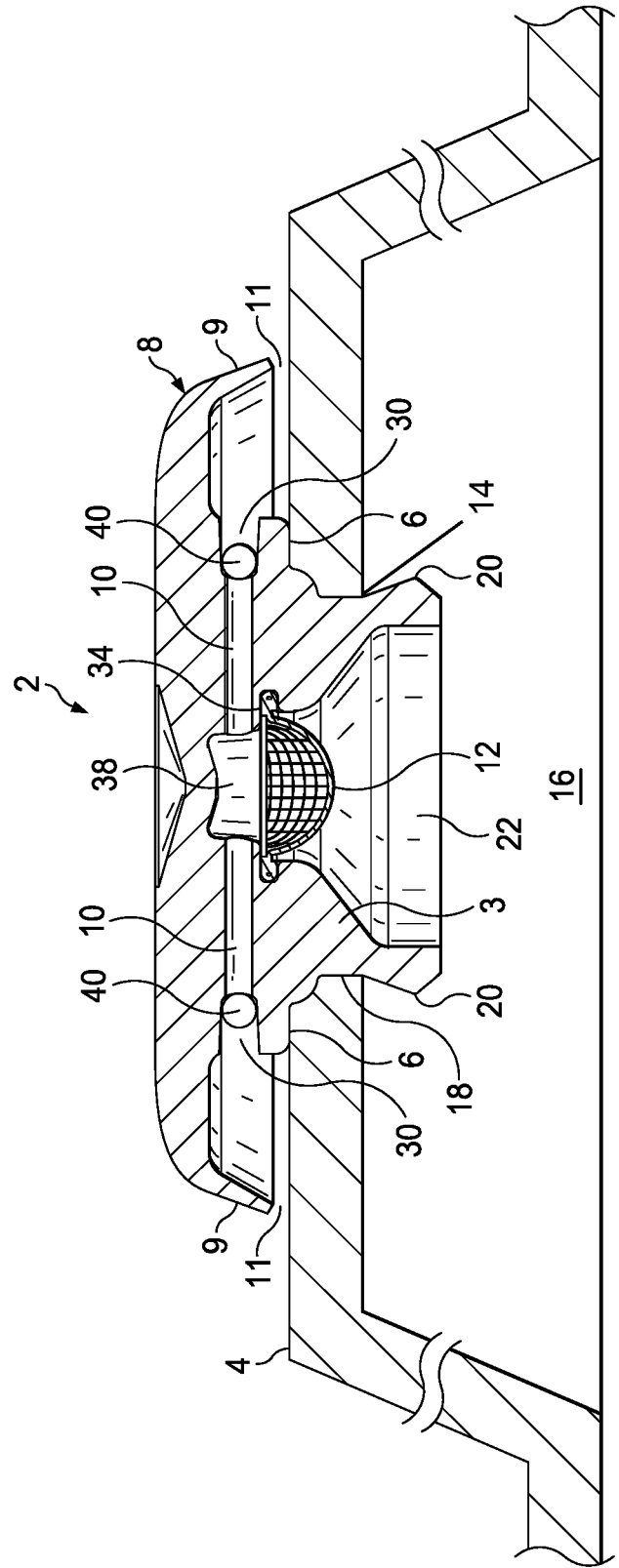
FIG. 3 illustrates a section view of a vent plug installed in a hub cap.

FIG. 3 illustrates cross-section A-A of the plug embodiment of FIG. 2A. In FIG. 3, the vent plug is shown as mounted to a hub cap 4. As may be seen in FIG. 3, a flared section of the stub 3 forms a flange 6 configured to sealingly abut the hub cap face when the plug 2 is installed into the hub cap 4. The vent plug 2 may also comprise a shroud 8. The shroud 8 may be somewhat ovoid in shape with one or more lobes 9 configured to shield one or more vent orifices 10. While the shroud 8 is shown to be somewhat ovoid, any geometry that allows for the disposition of the vent orifices may be acceptable. The stub 3 and shroud 8 may be a unitary body or separate components that can mate to one another.

The vent plug 2 may comprise one or more vent orifices 10 and a filter screen 12 configured to capture lubricant vapor and substantially prevent ingress of contaminants into a hub cap 4. Thus, the screen 12 may act as a coalescer or knockdown screen. The screen 12 may be removable, or may be formed as part of the vent plug. The vent plug 2 may comprise a resilient material configured to removably seat in the vent 14 of a hub cap. The vent plug 2 may comprise a material resistant to common vehicle lubricants and other common environmental conditions as found in the commercial vehicle industry. Such vents 14 may be those found on hub caps designed for heavy duty vehicle hubs and other hub caps wherein venting may be an issue.

As further seen in FIG. 3, the vent plug 2 is disposed in an opening 18 of the hub cap so as to permit pressure from the interior 16 of the hub cap to vent to atmosphere. In one embodiment, a flange 6 on a hub cap vent plug 2 may seat against the external face of a hub cap 4 while the stub 3 seats the opening 18 formed in the hub cap 4. A snap nub 20 may be disposed at the distal end of the stub 3 and be configured to rest against the internal face of the hub cap 4 so as to permit the vent plug to removably "snap" into the vent. The locking nub 20 may be of sufficient width such that the vent plug 2 may not disengage from the hub cap 4 under normal use of the hub cap, yet the vent plug 2 may still be disengaged from the hub cap 4 when so desired. For example, the vent plug 2 may be removed for replacement or repair by applying force to the bottom face of the flange 6. Such a locking nub 20 may encircle the entire circumference of the stub 3 or may be provided as a plurality of non-continuous nodules.

The fluid chamber 22 of the vent plug 2 may be in fluid communication with the interior 16 of the hub cap 4 and thus provide the first stage of an egress route for pressurized gas or vapor found inside the hub cap 4. The cavity may be of a wider diameter at the entry point than at the exhaust point. A vapor or knockout screen 12 may be disposed in the internal cavity 22 at or near the exhaust point of the cavity. Such a screen 12 may act as a coalescer to remove liquid particles entrained in any vapor to be vented and a filter for any entering contaminants.

The escaping vapor may then enter a small chamber 38. The chamber 38 may be a portion of the fluid chamber 22. From the small chamber 38, one or more venting orifices 10 may radiate through the stub 3 to open under the shroud 8. As shown in FIG. 3, the chambers 22, 38 may be disposed along a path of fluid communication from the interior of the hubcap to atmosphere. A screen 12 may be disposed along the path of fluid communication connecting the interior of the hubcap to atmosphere. Each venting orifice may terminate in the gland channel 30. The gland channel 30 may act as a diffuser for exiting vapor and gases, and also retain a sealing gland 40 that may be disposed therein in some embodiments. The vent orifices 10 may maintain fluid communication between the fluid chamber 22 and the shroud 8, thus allow venting from the hub cap 4 to atmosphere. A shroud 8 may be disposed at the proximal end of the stub 18 so as to partially cover the circumferential channel 30 of the channel. The shroud may be configured to allow vented fluid to flow from the vent orifices 10 to atmosphere by providing a gap 11 between the shroud and the hub cap wall through which vented fluid may flow. Such a shroud 8 may help to substantially prevent the influx of any contaminants entering the hub cap 4 from the external environment, and may serve to define an exhaust port for pressurized fluid escaping the hub cap. In other embodiments, the shroud may rest against the hub cap wall so as to seal the vent orifice(s) from atmosphere. The shroud may be configured to release vented fluid to atmosphere at low pressure. In some embodiments, for example, the pressure differential may be up to about 5 psi, but is desirably about two psi or lower, such as at one-half psi.

Figure 4:
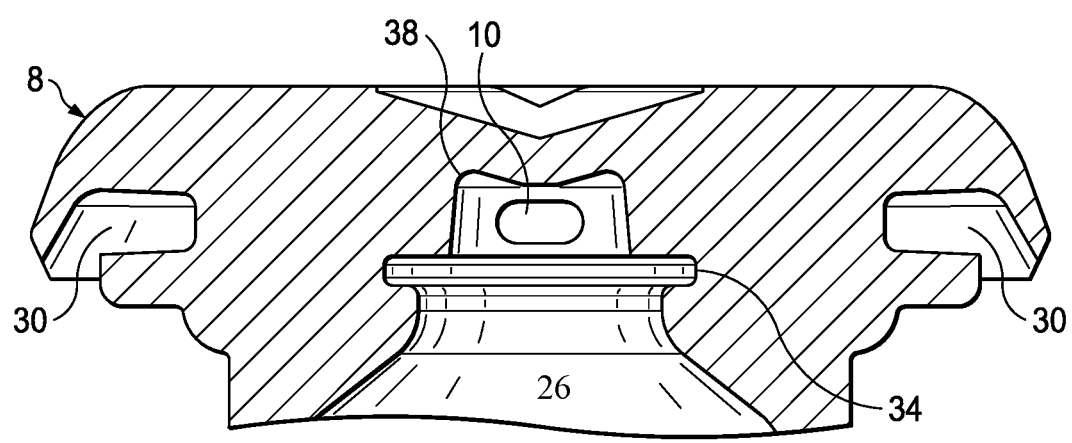
FIG. 4 illustrates an alternate section view of a vent plug.

A vent plug 2 may allow for a relatively high volume of flow concerning the venting of the pressurized fluid from the internal area of a hub cap. The high volume flow may be realized through the suitable sizing and geometry of the vent orifice 10 and the suitable sizing of the exit port 26. In some embodiments, the vent orifice 10 may be round, or may have any suitable cross-sectional shape. As may be seen in FIG. 4, which illustrates cross-section B-B of the embodiment of FIG. 2, the orifice 10 may be elongated in cross-sectional shape. In some embodiments, the orifice may have a height of about 0.08 inches, a width of about 0.16 inches, and a constant radius bend at the outer edges so as to form a semicircular edge. The orifice 10 may terminate at an outer surface of the plug, which may in turn empty into a cavity defined in part by the shroud 8. In some embodiments, an exit port may comprise a channel 30 circumscribing the vent plug.

In some embodiments, the shroud 8 may extend from the stub 3 to form lobes 9, as may be seen in the embodiment of FIG. 3. The shroud 8 of vent plug 2 may comprise a lobe 9 corresponding to the shroud side terminus of each vent orifice (not shown). Such a shroud 8 and may be realized as an integral component of the stub 18. Alternately, the shroud 8 may be a separate component attached to the stub 18. The shroud 8 may comprise a molded plastic or elastomeric material.

In some embodiments, as seen in FIG. 3, an o-ring 40 or resilient gland may be disposed about the vent plug in the channel 30 so as to substantially seal the orifice 10 from external contamination, such as pressurized water that may be used to clean the wheel end. Any suitable o-ring may be used and sized to substantially seal the orifice 10, but not provide significant resistance for pressurized fluid flowing through the plug above a threshold pressure differential. While an ideal cross-sectional geometry for the o-ring may be circular, any geometry may be utilized. In some embodiments, the threshold pressure differential may be up to about 5 psi, but is more suitably about two psi or lower, such as at one-half psi. A suitable o-ring may comprise nitrile rubber or silicone, for example, and may be about 2 mm thick and have a Shore A hardness of from about 50 to 70 durometer. Some examples of materials in this durometer range are pencil erasers, windshield wiper blades, car tires, plastic watch bands, and sneaker soles. However, any other material or hardness may be suitably used if the threshold pressure differential remains low. In some embodiments, if a gland is used, then the vent plug may not need a shroud.

Figure 5A:
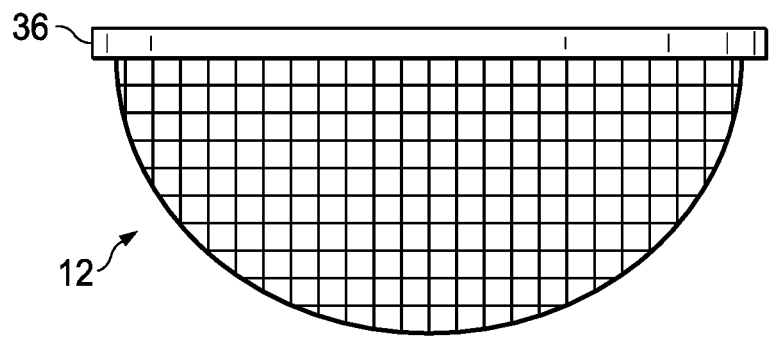
FIGS. 5A, 5B and 5C illustrate various embodiments of a screen.
Figure 5B:
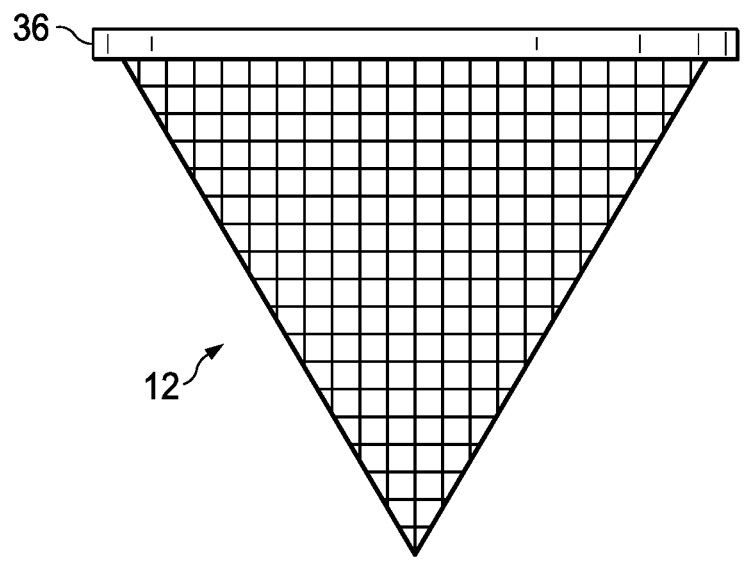
Figure 5C:
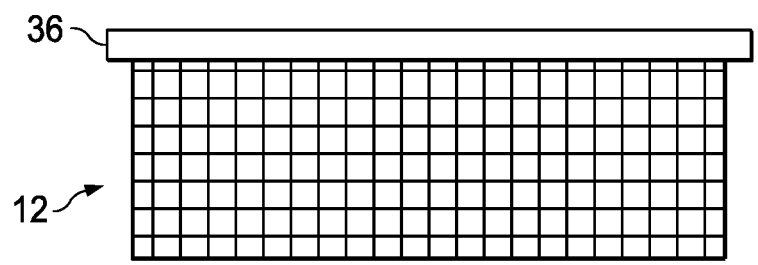
Figure 6:
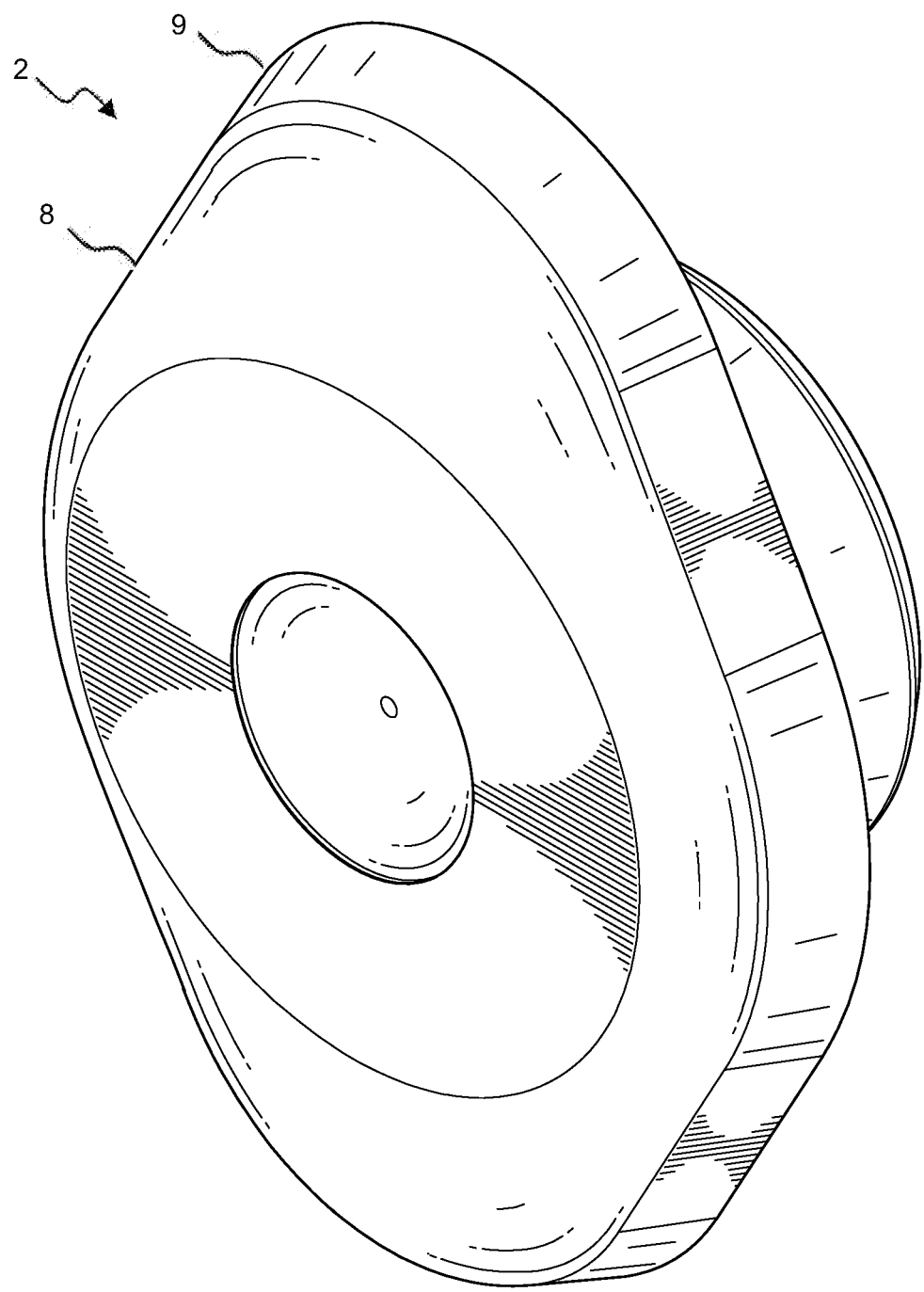
FIG. 6 illustrates a front perspective view of a hub cap vent plug.
Figure 7:
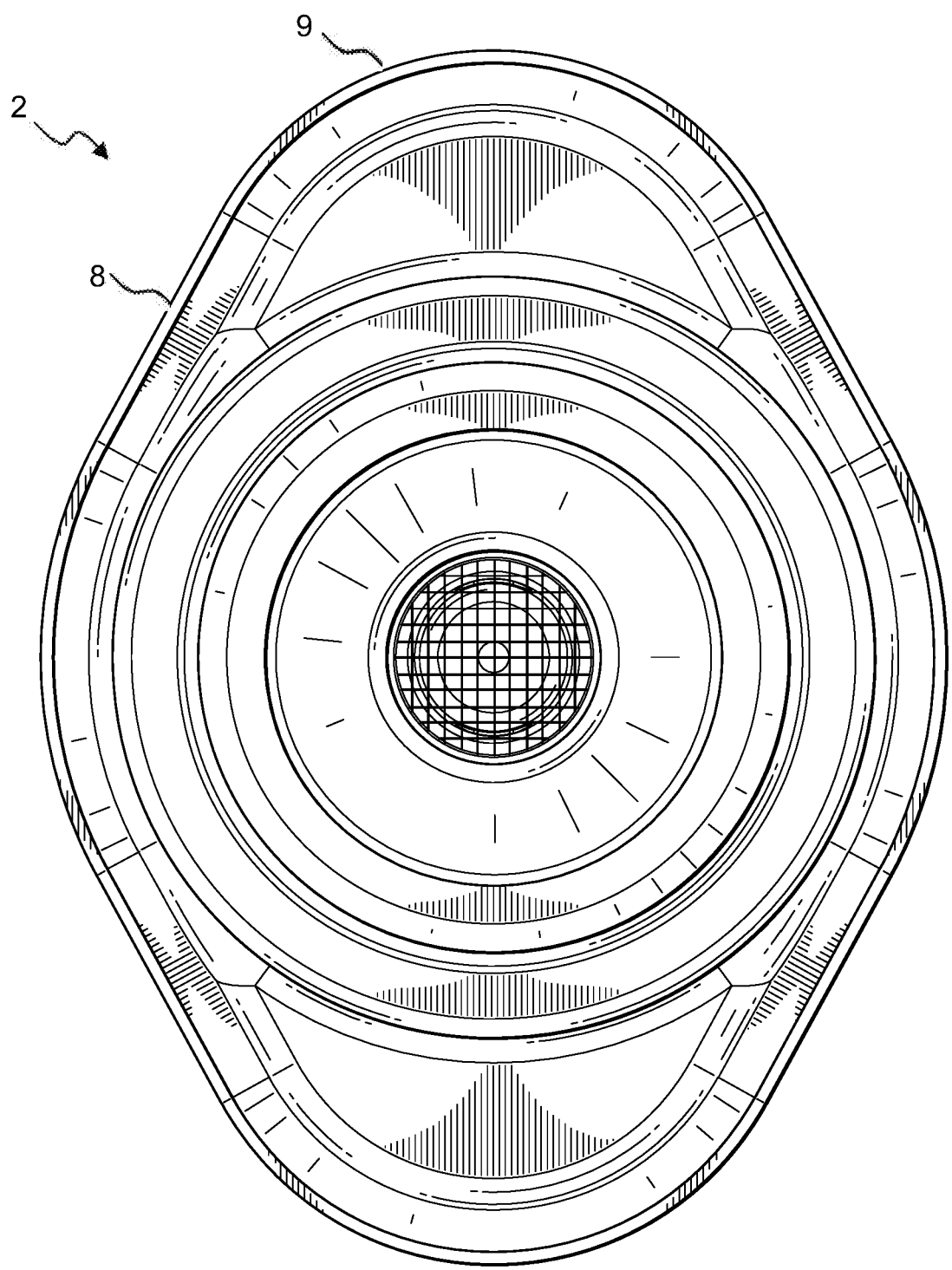
FIG. 7 illustrates a bottom view of a hub cap vent plug.
Figure 8:
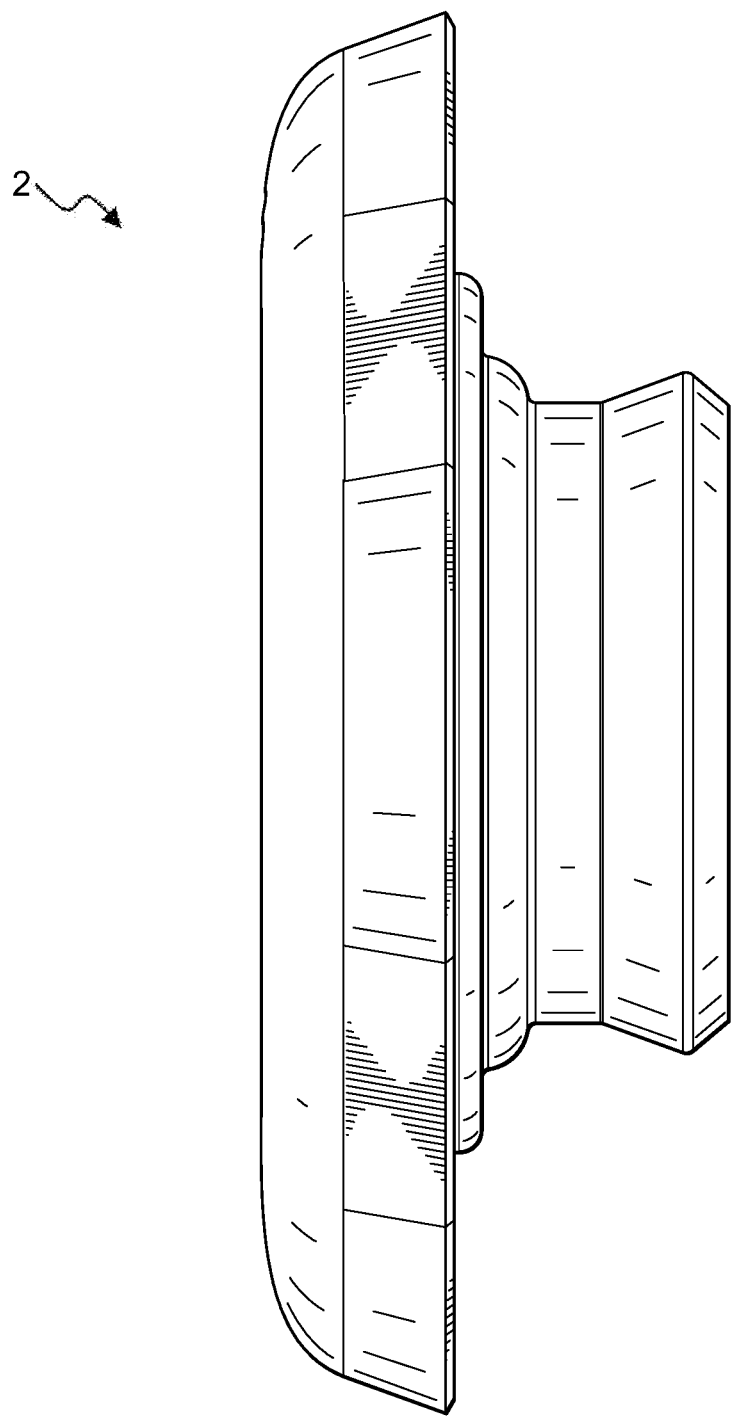
FIG. 8 illustrates a right-side view of a hub cap vent plug.
Figure 9:
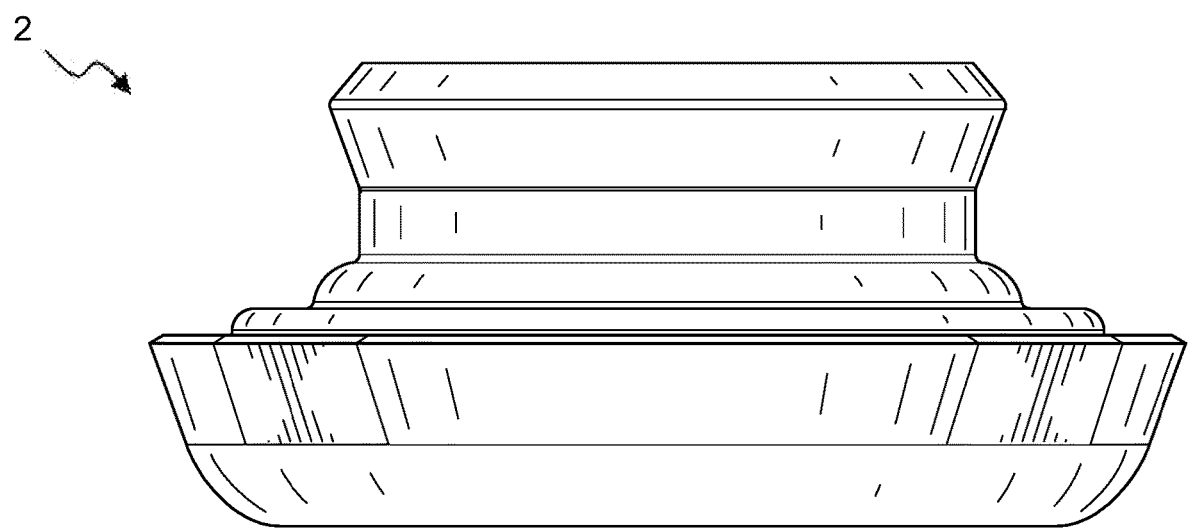
FIG. 9 illustrates a top view of a hub cap vent plug.

A retaining groove 34 may be provided in an inner diameter of the plug so as to permit removable engagement of a screen 12. As seen in FIGS. 5A, 5B and 5C, the screen 12 may take any one of many different geometries. The geometries may include a conical configuration, a cylindrical configuration, or ideally a hemispherical configuration (FIG. 3). One embodiment of such a knockdown screen 12 may comprise 50×50 stainless steel wire cloth or wire mesh with a retaining ring 36 at the open end of the hemisphere. The retaining ring 36 may be configured to fit within a retaining groove 34 of the vent plug 2 for removable disposition therein. The cloth or mesh size may be dependent on the aerosol or vapor that is to be removed from the air flow by the knockout screen 12. Thus, cloth or mesh size may be determined by the particular type of lubricant required for a specific hubcap 4 such that different embodiments of the vent plug may have different screens 12 that are dependent on the particular lubricant to be used in the target hubcap 4. Alternately, the vent plug 2 may be standardized for all lubricant types and maintain a removable screen 12. The removable screens 12 may allow the vent plug 2 to be adapted to any lubricant by the simple expedience of inserting the appropriate knockdown screen 12. A benefit of using a screen instead of a one-way valve, such as a duck bill or flow valve, is that pressurized fluid may freely flow through the screen, thus avoiding the need to overcome the pressure differential of a one-way valve. Such an approach allows the pressure in the hub cap to remain at substantially atmospheric pressure.

Other embodiments may use a different material for the screen 12. Any material that hampers or prevents the ingress or egress of liquids while allowing the pressurized vapor to pass through the screen may be appropriate for a screen material. Felt pad, steel wool, certain fabrics, sintered metal, ceramics and vapor permeable membranes such as those used in reverse osmosis filters and desalination applications are all possible substitutes for a wire mesh.

Figure 10:
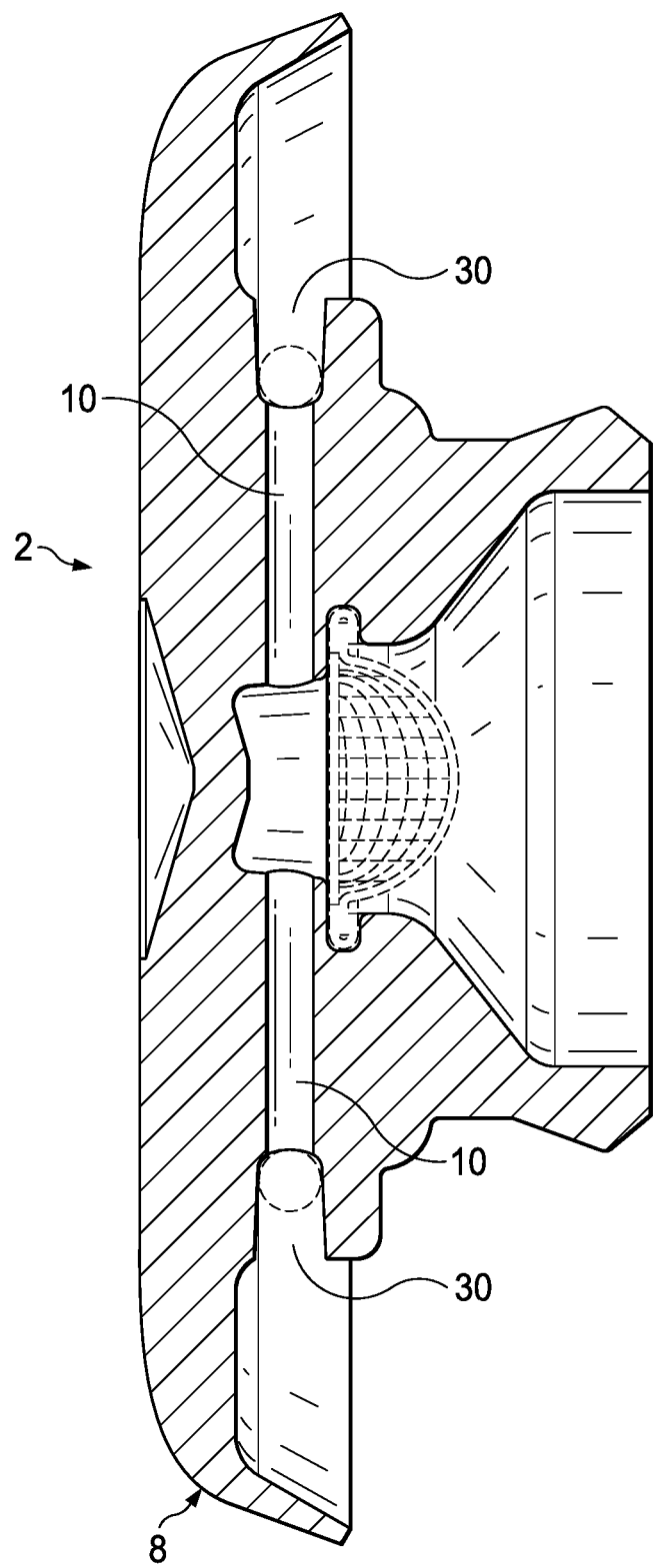
FIG. 10 illustrates a section view of a vent plug.

FIGS. 6-9 show various views of the embodiment of FIG. 2. FIG. 10 shows a view of the embodiment of FIG. 2 without a screen or gland but showing by broken lines where a screen or gland may be disposed if used. Thus, a hub cap vent plug may be provided in a variety of configurations, such as those set out in the numbered clauses below.

Although the disclosed subject matter and its advantages have been described in detail, it should be understood that various changes, substitutions and alterations can be made herein without departing from the subject matter as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of air pressure. Accordingly, the appended claims are intended to include within their scope such processes, machines, manufacture, compositions of matter, means, methods, systems or steps.

I claim:

1. A hub cap vent plug comprising:
a stub configured for sealing disposition in a vent opening of a hub cap, the stub forming a fluid chamber and one or more vent orifices extending from the fluid chamber, the one or more vent orifices extending radially from the fluid chamber and configured to allow communication of fluid from said fluid chamber to atmosphere;
a shroud disposed at the end of the stub and extending over an opening for each of the one or more vent orifices; and
a screen disposed in a path of fluid communication for connecting the interior of said hubcap to atmosphere, the screen being configured to capture vapor from fluid vented from the hub cap.

2. The hub cap vent plug of claim 1, wherein the shroud and the stub are formed as a unitary body.

3. The hub cap vent plug of claim 1 further comprising:
a gland channel circumscribing the exterior circumference of the stub, the gland channel being located under the shroud, the one or more vent orifices terminated at the gland channel and in fluid communication therewith; and a gland disposed in the gland channel so as to seal the one or more vent orifices.

4. The hub cap vent plug of claim 1, the stub comprising a snap nub configured to removably retain the stub in said vent opening of the hub cap.

5. The hub cap vent plug of claim 1, the screen comprising a stainless steel wire cloth.

6. The hub cap vent plug of claim 1, the screen having a hemispherical configuration.

7. The hub cap vent plug of claim 1, the screen having a conical configuration.

8. The hub cap vent plug of claim 1, the screen having a cylindrical configuration.

9. The hub cap vent plug of claim 1, the screen comprising a retaining ring configured to removably engage the stub.

10. The hub cap vent plug of claim 1, the screen configured to capture vapor particles from a fluid passing therethrough.

11. The hub cap vent plug of claim 3, the gland comprising an o-ring.

12. The hub cap vent plug of claim 11, the o-ring comprising nitrile rubber or silicone.

13. The hub cap vent plug of claim 11, the o-ring configured to seal the one or more vent orifices but to allow fluid to escape from the fluid channel to atmosphere when a pressure differential between the inside of the hubcap and atmosphere is in the range of ½ psi to 5 psi, inclusive.

14. The hub cap vent plug of claim 11, the o-ring configured to seal the one or more vent orifices at a pressure differential between the inside of the hubcap and atmosphere of no more than 2 psi but allow fluid to escape from the fluid channel to atmosphere when the pressure differential is above psi at most.

15. A hub cap vent plug comprising:
a stub configured for sealing disposition in a vent opening of a hub cap, the stub forming a fluid chamber and one or more vent orifices extending from the fluid chamber, the one or more vent orifices extending radially from the fluid chamber and configured to allow communication of fluid from the fluid chamber to atmosphere;
a shroud formed as a unitary body with the stub and disposed at the end of the stub, the shroud extending over an opening for each of the one or more vent orifices; and
a screen disposed in a path of fluid communication comprising said fluid chamber, the screen being configured to capture vapor from fluid vented from the hub cap when the vent plug is mounted to the hubcap.

16. A hub cap vent plug comprising:
a stub configured for sealing disposition in a vent opening of a hub cap, the stub forming a fluid chamber and one or more vent orifices extending from the fluid chamber, the one or more vent orifices extending radially from the fluid chamber and configured to allow communication of fluid from the fluid chamber to atmosphere;
a screen disposed in a path of fluid communication comprising said fluid chamber, the screen being configured to capture vapor from fluid vented from the hub cap; and
a gland disposed about the stub so as to seal the one or more vent orifices to flow from the inside of the hubcap to atmosphere at low pressure differentials but to allow fluid flow from the inside of the hubcap to atmosphere above a threshold pressure differential when the vent plug is mounted to the hub cap.

17. The hub cap vent plug of claim 16 further forming a gland channel circumscribing the exterior circumference of the plug body, the one or more vent orifices terminated at the gland channel and in fluid communication therewith; the gland being disposed in the gland channel.

18. The hub cap vent plug of claim 16 wherein the threshold pressure differential is between one half psi to 5 psi.

19. The hub cap vent plug of claim 1, the shroud being disposed away from the hub cap so as to form a gap between the shroud and the hubcap through which fluid may vent to atmosphere when the plug is mounted to said hubcap.

* * * * *